UNITED STATES PATENT OFFICE.

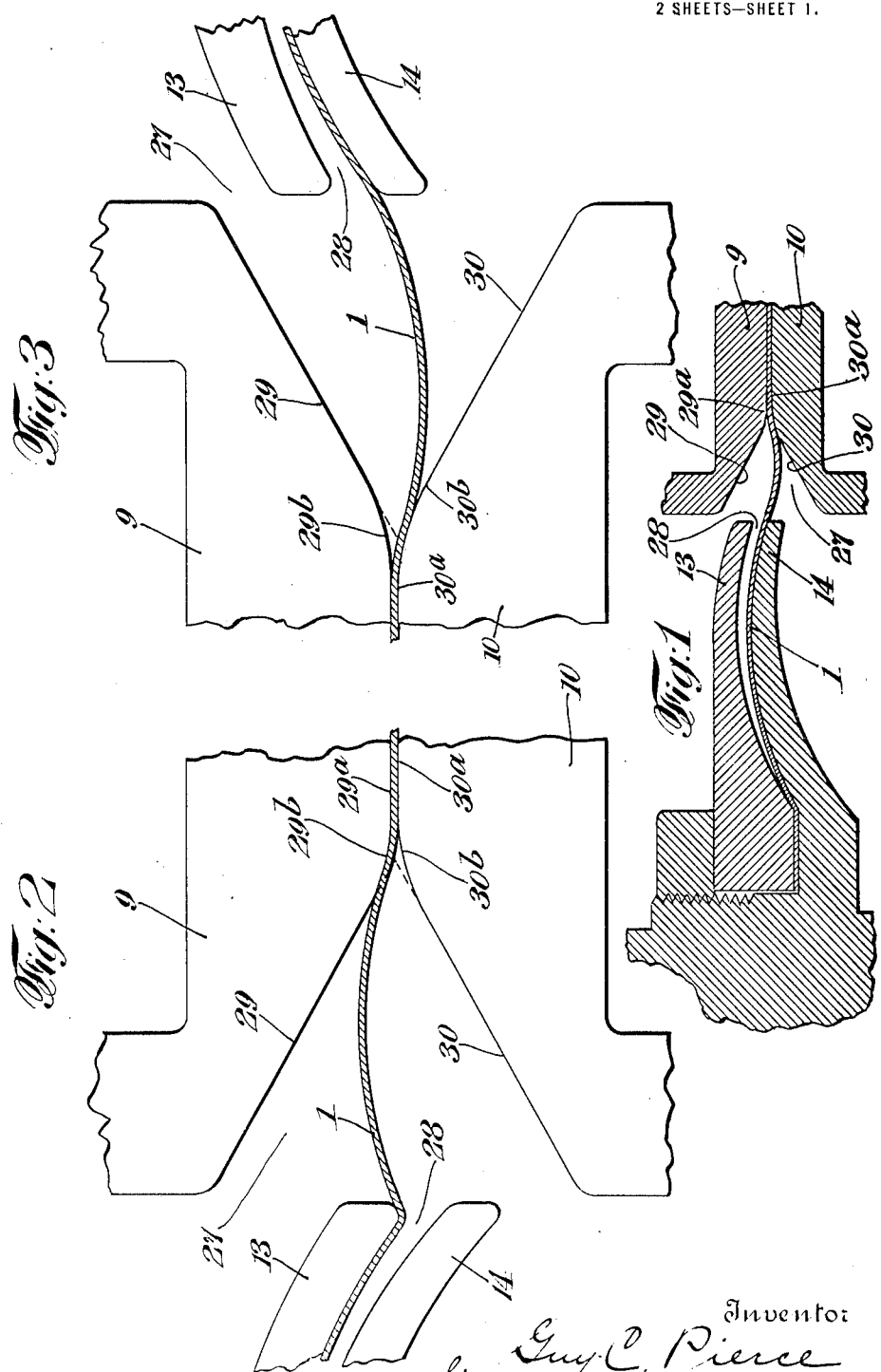

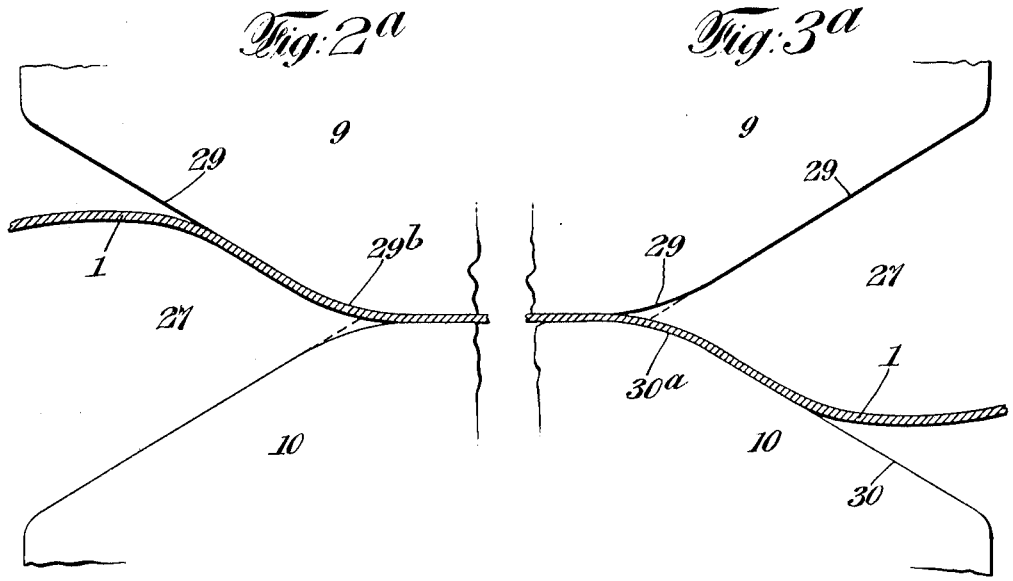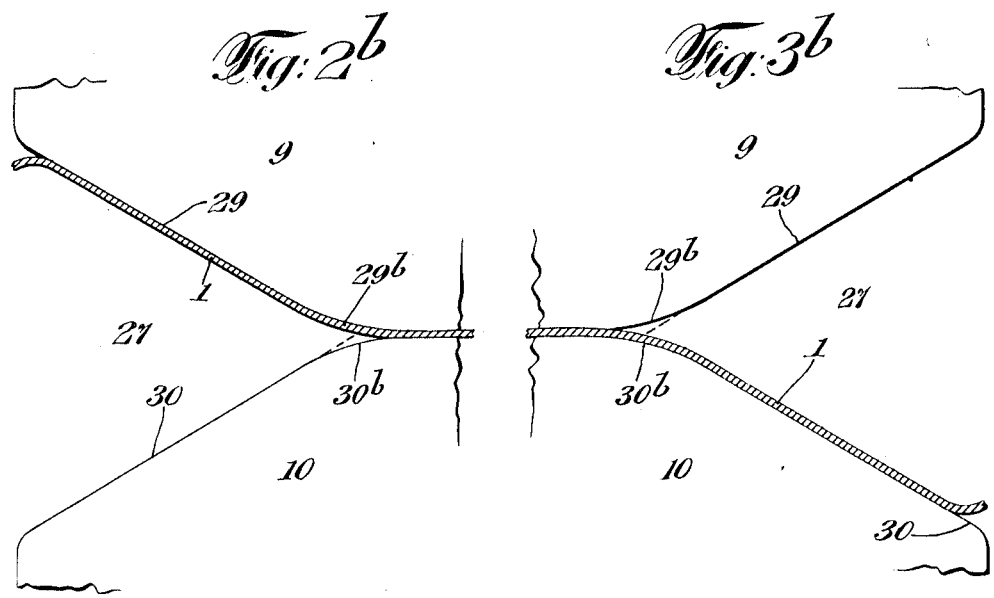

GUY C. PIERCE, OF NEW YORK, N. Y., ASSIGNOR, BY MESNE ASSIGNMENTS, TO AUTOMATIC STRAIGHT AIR BRAKE COMPANY, OF WILMINGTON, DELAWARE, A CORPORATION OF DELAWARE.

MEANS FOR SUPPORTING DIAPHRAGMS.

1,273,534.  Specification of Letters Patent.  Patented July 23, 1918.

Application filed December 15, 1916. Serial No. 137,226.

*To all whom it may concern:*

Be it known that I, GUY C. PIERCE, a citizen of the United States, and resident of the borough of Manhattan, city, county, and State of New York, have invented certain new and useful Improvements in Means for Supporting Diaphragms, of which the following is a specification.

This invention relates to certain improvements in the means for supporting diaphragms shown in my Patent No. 1,062,300, dated May 20, 1913.

In the drawings; Figure 1 is a vertical central sectional view of a portion of a diaphragm and its supporting means;

Fig. 2 a detail sectional view on a large scale, showing a portion of the supporting means, the pressure for moving the diaphragm being below the diaphragm;

Fig. 3 a view similar to Fig. 1, with the pressure indicated as being above the diaphragm;

Fig. 2ª a view similar to Fig. 2, showing the diaphragm midway between its upper and central positions;

Fig. 3ª a view similar to Fig. 3, showing the diaphragm midway between its central and lower positions;

Fig. 2ᵇ a view similar to Fig. 2ª, the diaphragm being in its extreme upper position; and Fig. 3ᵇ a view similar to Fig. 3ª, showing the diaphragm in its extreme lower position.

It will, of course, be understood that while I have used the terms "upper" and "lower" in describing the positions of the diaphragm, the diaphragm may be used in any desired position, and the terms "upper" and "lower" are used merely for convenience of description.

Referring to the various parts by numerals, 1 designates the diaphragm, which may be formed of a single sheet of annealed copper, or of a plurality of sheets, as described in my before-mentioned patent. The marginal edge of the diaphragm is supported between flanges 9 and 10 of the containing casing, as described in my aforesaid patent; and the central body portion of the diaphragm is sustained between two clamping disks and supporting members 13 and 14. These supporting members have their adjoining faces curved so that they fit into each other spoon-like, an inwardly tapering recess 28 being formed between said members, and in which the diaphragm is supported. The inner marginal edge of the diaphragm is firmly clamped between the parallel faces of the central clamping portion of the supporting members, as shown clearly in Fig. 1.

The adjacent faces of the flanges 9 and 10 are beveled or cut away to form a circumferential inwardly widening recess 27, the width of said recess at the inner marginal edges of the flanges 9 and 10 determining the extent of the possible vibration of the diaphragm. The supporting members 13 and 14 are of substantially the same diameter as the interior of the containing casing so that the free portion of the diaphragm is that which lies between the margin of the supporting members 13 and 14 and the permanently clamped outer marginal portion of the diaphragm at the outer contracted end of the recess 27. The outwardly converging surfaces 29 and 30 of the flanges 9 and 10, respectively, are straight until they closely approach the parallel clamping surfaces 29ª and 30ª, the said surface 30 being connected to the surface 30ª by the curved portion 30ᵇ; and the portion 29 being connected to the clamping portion 29ª by the curved convex portion 29ᵇ. By providing the curved connecting surfaces 29ᵇ and 30ᵇ there are no abrupt shoulders or edges at the junction of the diverging surfaces 29 and 30 with the parallel clamping surfaces 29ª and 30ª.

In Fig. 2 the diaphragm 1 is upwardly curved to indicate that pressure is in the chamber below said diaphragm and that the diaphragm is moving in the direction of the arrow in said figure. It will be noted that the outer marginal portion of the diaphragm has shaped itself to the line of the curved surface 29ᵇ, and that there are no abrupt shoulders or edges with which the said diaphragm must contact. In Fig. 2ª the diaphragm is indicated as having moved upwardly approximately one-half way between its central and extreme upper positions. In this view it will also be noted that the diaphragm has progressively engaged the surface 29 of the flange 9 of the containing casing, and that there is a rolling contact between the diaphragm and the surface 29, giving a progressively extended hinge effect between the diaphragm and the supporting flanges.

In Fig. 2ᵇ the diaphragm is indicated as having reached the limit of its upward movement; that is to say, its movement in one direction, and the said diaphragm is shown in engagement with the entire surface 29.

In Fig. 3 the diaphragm is shown in its central position with the unsupported portion curved toward the surface 30, indicating that pressure is above the diaphragm. The action of the diaphragm at its outer supported edge is, in this view, shown as the reverse of that indicated in Fig. 2.

In Fig. 3ᵃ the action and position of the diaphragm are indicated as exactly the reverse of the position shown in Fig. 2ᵃ; and in Fig. 3ᵇ the action and position of the diaphragm are shown as the reverse of that indicated in Fig. 2ᵇ.

The main object of the improvement in the form of the supporting means is to provide a diaphragm capable of a greater movement than that shown in Patent No. 1,062,300, without losing or sacrificing any of the advantages obtained through the use of the supporting means shown in the said patent. By connecting the outwardly converging surfaces 29 and 30 to the parallel clamping surfaces 29ᵃ and 30ᵃ by means of the convex surfaces 29ᵇ and 30ᵇ, the diaphragm at its outer marginal portion will be in constant contact with the supporting surfaces, and there will be no abrupt bending or curving of the diaphragm during its reciprocation and during its movement across the line of its central position in either direction.

Another important object of the invention is to construct the means for supporting the outer marginal edge of the diaphragm in such manner that there will be a progressive engagement between the diaphragm and the surface of one of the flanges 9 and 10, the said progressive engagement between said parts giving a constantly varying point of support to the diaphragm, and constantly reducing the area of the unsupported part of the diaphragm.

What I claim is:

In a diaphragm device a metal diaphragm, a support for the margin of said diaphragm, that portion of the diaphragm within the margin of said support being of considerably greater area than the space inclosed by the inner margin of said support, said support having clamping faces to receive the outer margin of the diaphragm and inwardly diverging faces forming a circumferential inwardly widening recess and convex surfaces connecting the said diverging faces to the clamping faces, means for supporting the central portion of said diaphragm said means comprising a pair of disks between which said diaphragm is clamped, said disks having curved surfaces one of said surfaces being concave and the other convex to maintain that portion of the diaphragm between said disks permanently convexed in one direction and diverging outwardly to form a gradually enlarging recess between said disks, that portion of the diaphragm between the margin of the clamping disks and the margin of the clamping surfaces of the support being curved on a line transverse of the support and of a different curvature from that portion of the diaphragm between the disks whereby the free portion of the diaphragm will conform to the convex surfaces of the support and will have a gradually increasing bearing upon the diverging faces of the support as the said diaphragm is flexed in either direction.

In testimony whereof I hereunto affix my signature.

GUY C. PIERCE.